United States Patent
Kim et al.

(10) Patent No.: US 10,681,406 B2
(45) Date of Patent: **\*Jun. 9, 2020**

(54) DISPLAY APPARATUS, METHOD FOR EXECUTING APPLICATION THEREOF, EXTERNAL DEVICE REMOTELY CONTROLLING THE DISPLAY APPARATUS, AND METHOD FOR PROVIDING APPLICATION CONTROL SCREEN THEREOF

(71) Applicant: SAMSUNG ELECTRONICS CO., LTD., Gyeonggi-do (KR)

(72) Inventors: Joo-youn Kim, Seoul (KR); Yong-hwan Kwon, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,251

(22) Filed: Jan. 4, 2019

(65) Prior Publication Data

US 2019/0141384 A1   May 9, 2019

Related U.S. Application Data

(63) Continuation of application No. 13/584,285, filed on Aug. 13, 2012, now Pat. No. 10,194,191.

(30) Foreign Application Priority Data

Aug. 25, 2011   (KR) .................. 10-2011-0085306

(51) Int. Cl.
 *G06F 5/00*  (2006.01)
 *H04N 21/422* (2011.01)
 (Continued)

(52) U.S. Cl.
 CPC ........... *H04N 21/4222* (2013.01); *G06F 9/54* (2013.01); *H04N 21/42207* (2013.01);
 (Continued)

(58) Field of Classification Search
 CPC .................................................. H04N 21/422
 See application file for complete search history.

(56) References Cited

U.S. PATENT DOCUMENTS 8,793,720 B2   7/2014   Simoes Rodrigues et al.
9,232,193 B2   1/2016   Lee et al.
(Continued)

FOREIGN PATENT DOCUMENTS

CN   1355994 A   6/2002
CN   101888528 A   11/2010
(Continued)

OTHER PUBLICATIONS

Communication dated Mar. 29, 2019, issued by the European Patent Office in counterpart European Application No. 18210891.0.
(Continued)

*Primary Examiner* — Joseph R Haley
(74) *Attorney, Agent, or Firm* — Sughrue Mion, PLLC

(57) ABSTRACT

A display apparatus, a method for executing an application thereof, an external device remotely controlling the display apparatus, and a method for providing an application control screen thereof are provided. The display apparatus includes a display that displays an application execution screen, the application execution screen displaying an application; a communication unit that communicates with an external server and an external device that remotely controls the display apparatus; and a control unit that transmits to the external device a generation signal that instructs the external device to generate an application control screen in response to receiving an input command to execute the application,
(Continued)

controls the communication unit to receive a command from the external device input through the application control screen, and operates the application according to the received command.

12 Claims, 8 Drawing Sheets

(51) Int. Cl.
  *G06F 9/54* (2006.01)
  *H04N 21/81* (2011.01)
(52) U.S. Cl.
  CPC . *H04N 21/42209* (2013.01); *H04N 21/42221* (2013.01); *H04N 21/812* (2013.01); *H04N 21/8173* (2013.01); *G06F 2209/549* (2013.01)

(56) References Cited

U.S. PATENT DOCUMENTS

| | | | |
|---|---|---|---|
| 9,609,396 | B2 | 3/2017 | Rodrigues et al. |
| 2005/0055640 | A1 | 3/2005 | Alten |
| 2010/0017736 | A1 | 1/2010 | Kim |
| 2010/0293586 | A1 | 11/2010 | Simoes Rodrigues et al. |
| 2011/0043326 | A1 | 2/2011 | Lee et al. |
| 2011/0084899 | A1 | 4/2011 | Jung et al. |
| 2011/0138416 | A1 | 6/2011 | Kang et al. |
| 2011/0304539 | A1 | 12/2011 | Lee et al. |
| 2012/0033140 | A1 | 2/2012 | Xu |
| 2014/0337908 | A1 | 11/2014 | Simoes Rodrigues et al. |
| 2016/0080799 | A1 | 3/2016 | Lee et al. |

FOREIGN PATENT DOCUMENTS

| | | |
|---|---|---|
| JP | 2001-45322 A | 2/2001 |
| JP | 2003-502921 A | 1/2003 |
| JP | 2003-522482 A | 7/2003 |
| JP | 2006-236285 A | 9/2006 |
| JP | 2010-268462 A | 11/2010 |
| JP | 2011-41254 A | 2/2011 |
| KR | 1020110018697 A | 2/2011 |
| WO | 00/78050 A1 | 12/2000 |
| WO | 0158151 A2 | 8/2001 |
| WO | 2009/135312 A1 | 11/2009 |

OTHER PUBLICATIONS

Brad A. Myers et al., "Extending the Windows Desktop Interface With Connected Handheld Computers", USENIX, XP061011424, Jan. 30, 2002, 10 pages.
Communication dated Apr. 26, 2016, from the Japanese Patent Office in counterpart application No. 2012-184056.
Sjolund, M. et al. "Smartphone Views: Building Multi-Device Distributed User Interfaces," Mobile Human-Computer Interaction—MobileHCI 2004. Proceedings (lecture Notes in Comput. Sci. vol. 3160) Springer-Verlag Berlin, Germany. 2004. pp. 507-511. XP002688700.
Communication dated dated Mar. 17, 2017, issued by the State Intellectual Property Office of P.R. China in counterpart Chinese Application No. 201210303501.8.
Communication dated May 4, 2018 issued by the European Patent Office in counterpart Application No. 12181425.5.
Communication dated Nov. 22, 2016 issued by the Japanese Patent Office in counterpart Japanese Patent Application No. 2012-184056.
Communication dated Jan. 11, 2013, issued by the European Patent Office in counterpart European Application No. 12181425.5.
Richard Arthur et al., "XICE Windowing Toolkit: Seamless Display Annexation", ACM Transactions on Computer-Human Interaction, vol. 18, No. 3, Article 14, Jul. 2011, 46 pages total, XP055465442.
Communication dated Apr. 4, 2018, issued by the State Intellectual Property Office of the Peoples Republic of China in counterpart Chinese Patent Application No. 201210303501.8.
Communication dated Jul. 4, 2016, issued by the State Intellectual Property Office of People's Republic of China in counterpart Application No. 201210303501.8.
Bohnyun, Koo et al. "R-URC:RF4CE-based Universal Remote Control Framework using Smartphone," Proceedings of the 2010 International Conference on Computational Science and its Applications (ICCSA 2010) IEEE Computer Society Los Alamitos, CA, USA. 2010. pp. 311-314. XP002688701.
Communication dated Feb. 1, 2018, issued by the Korean Intellectual Property Office in counterpart Korean Patent Application No. 10-2017-0154633.
Brad A. Myers et al., "Taking Handheld Devices to the Next Level", Cover Feature, IEEE Computer Society, Dec. 2004, pp. 36-43, XP011124581.
Myers, Brad A. "Using Handhelds and PCs Together," Communications of the ACM. Nov. 2011. pp. 34-41. vol. 44, No. 11. USA. XP002688699.
Communication dated Feb. 15, 2017, issued by the Korean Intellectual Property Office in counterpart Korean Application No. 10-2011-0085306.
Office Action in U.S. Appl. No. 13/584,285 dated Mar. 6, 2014.
Office Action in U.S. Appl. No. 13/584,285 dated Aug. 19, 2014.
Office Action in U.S. Appl. No. 13/584,285 dated Dec. 26, 2014.
Office Action in U.S. Appl. No. 13/584,285 dated May 15, 2015.
Office Action in U.S. Appl. No. 13/584,285 dated Nov. 27, 2015.
Office Action in U.S. Appl. No. 13/584,285 dated May 12, 2016.
Office Action in U.S. Appl. No. 13/584,285 dated Sep. 8, 2016.
Office Action in U.S. Appl. No. 13/584,285 dated Feb. 17, 2017.
Office Action in U.S. Appl. No. 13/584,285 dated Jun. 14, 2017.
Office Action in U.S. Appl. No. 13/584,285 dated Nov. 30, 2017.
Office Action in U.S. Appl. No. 13/584,285 dated Mar. 7, 2018.
Notice of Allowance in U.S. Appl. No. 13/584,285 dated Aug. 28, 2018.
Communication dated Apr. 26, 2016, issued by the European Patent Office in counterpart European Application No. 12181425.5.
Communication dated Nov. 6, 2018 issued by the State Intellectual Property Office of P.R. China in counterpart Chinese Patent Application No. 201210303501.8.
Communication dated Jul. 11, 2019, issued by the Korean Intellectual Property Office in counterpart Korean Patent Application No. 10-2018-0144795.
Communication dated Jan. 21, 2020, issued by the European Patent Office in counterpart European Application No. 18 210 891.0.

DISPLAY APPARATUS, METHOD FOR EXECUTING APPLICATION THEREOF, EXTERNAL DEVICE REMOTELY CONTROLLING THE DISPLAY APPARATUS, AND METHOD FOR PROVIDING APPLICATION CONTROL SCREEN THEREOF

CROSS-REFERENCE TO RELATED APPLICATIONS

This is a continuation of U.S. application Ser. No. 13/584,285 filed on Aug. 13, 2012, which claims priority from Korean Patent Application No. 10-2011-0085306, filed on Aug. 25, 2011 in the Korean Intellectual Property Office, the disclosure of which is incorporated herein by reference in its entirety.

BACKGROUND

1. Field

Methods and apparatuses consistent with exemplary embodiments of the present disclosure relate to a display apparatus, a method for executing an application thereof, an external device remotely controlling the display apparatus, and a method for providing an application control screen thereof, and more particularly to a display apparatus which can be remotely controlled through an external device provided with a display screen, a method for executing an application thereof, an external device, and a method for providing an application control screen thereof.

2. Description of the Related Art

In the related art, a remote controller provided with numeral keys, channel/volume adjustment keys, and direction keys has been used to control a display apparatus. However, due to limited key configurations of the remote controller in the related art, there is a limit in operating diverse complicated applications using the remote controller. In addition, it is required for application providers to develop applications so that such applications can be operated with the limited key configurations of the remote controller.

Further, users must install and access separate application stores in order to download applications to be executed in the display apparatuses, and this causes inconvenience in use.

Accordingly, there is a need for schemes for providing an application dedicated operating method that is optimized according to diverse applications and downloading the applications without accessing application stores.

SUMMARY

One or more exemplary embodiments provide a display apparatus and a method for executing an application thereof, which transmit a generation signal for generating an application control screen to an external device if an execution command for an application is input, and operate the application according to a user command if the user command is input from the external device through the application control screen.

One or more exemplary embodiments also provide an external device and a method for providing an application control screen thereof, which display an application control screen that corresponds to an application if a generation signal for generating the application control screen is received from a display device.

According to an aspect of an exemplary embodiment, there is provided a method for executing an application of a display apparatus including: displaying an application execution screen and executing an application in response to an application execution input; transmitting, to an external device that remotely controls the display apparatus, a generation signal that instructs the external device to generate an application control screen for controlling of the application; receiving a application control input through the application control screen of the external device; and operating the application according to the received application control input.

The method may further include receiving the application and application control screen data that corresponds to the application from an external server; and transmitting the application control screen data to the external device, wherein the generation signal instructs the external device to generate the application control screen using the application control screen data transmitted to the external device.

The generation signal may include application control screen data that corresponds to the application and a command that instructs the external device to generate the application control screen.

Further, the generation signal may be a signal configured according to parameters of the application and instructs the external apparatus to display the application control screen in a form of a user interface window that includes at least one of a region for receiving an application dedicated control command or an image.

The application control screen may include an advertisement region in which an advertisement message for a specified application is displayed.

The method may further include transmitting data for generating the advertisement message to the external device in response to receiving the data for generating the advertisement message from an external server.

The method may further include downloading the specified application that corresponds to the advertisement region from an external server in response to receiving a selection input of the advertisement region on the external device; and installing the specified application.

The specified application may be one of a newly uploaded application, an application recommended by a service provider, an application for a category designated by a user, and an application related to a currently executed application on the display apparatus According to an aspect of another exemplary embodiment, there is provided a display apparatus including: a display that displays an application execution screen, the application execution screen displaying an application; a communication unit that communicates with an external server and an external device that remotely controls the display apparatus; and a control unit that transmits to the external device a generation signal that instructs the external device to generate an application control screen in response to an application execution input, controls the communication unit to receive a application control input from the external device input through the application control screen, and operates the application according to the received application control input.

The control unit may control the communication unit to receive the application and application control screen data that corresponds to the application from an external server and to transmit the application control screen data to the external device, and the generation signal instructs the external device to generate the application control screen using the application control screen data transmitted to the external device.

The generation signal may include application control screen data that corresponds to the application and a command that instructs the external device to generate the application control screen.

Further, the generation signal may be a signal configured according to parameters of the application and instructs the external apparatus to display the application control screen in a form of a user interface window that includes at least one of a region for receiving an application dedicated control command or an image.

The application control screen may include an advertisement region in which an advertisement message for a specified application is displayed.

The control unit may transmit data for generating the advertisement message to the external device in response to receiving the data for generating the advertisement message from an external server.

The control unit may control the communication unit to download the specified application that corresponds to the advertisement region from an external server in response to receiving a selection input of the advertisement region on the external device, and install the specified application.

The specified application may be one of a newly uploaded application, an application recommended by a service provider, an application for a category designated by a user, and an application related to a currently executed application on the display apparatus.

According to an aspect of another exemplary embodiment, there is provided a method for providing an application control screen of an external device that remotely controls a display apparatus including: receiving from the display apparatus a generation signal that instructs the external device to generate an application control screen for controlling of the application; displaying the application control screen of the application in response to receiving the generation signal; and transmitting to the display apparatus a application control input in response to receiving a application control input through the application control screen.

The application control screen is received from the display apparatus or is pre-stored during manufacturing of the display apparatus.

The method for providing an application control screen of an external device according to the aspect of the present disclosure may further include displaying an advertisement message for a specified application on a first region of a display screen in response to receiving the advertisement message for the specified application from the display apparatus.

The advertisement message that is displayed on the first region of the display screen may include information of the specified application.

The method may further include generating a graphic user interface (GUI) for downloading the specified application in response to receiving a selection input of the first region of the display screen.

The method may further include transmitting a download command signal for the specified application to the display apparatus in response to receiving the download command for the specified application input through the GUI.

According to an aspect of another exemplary embodiment, there is provided an external device that remotely controls a display apparatus including: a communication unit that communicates with the display apparatus; a display unit; and a control unit that controls the display unit to display an application control screen of an application in response to receiving from the display apparatus a generation signal that instructs the external device to generate the application control screen for controlling of the application, and controls the communication unit to transmit an application control input to the display apparatus in response to receiving the application control input through the application control screen.

The application control screen is received from the display apparatus or is pre-stored during manufacturing of the display apparatus.

The control unit may control the display unit to display an advertisement message for a specified application on a first region of a display screen in response to receiving the advertisement message for the specified application from the display apparatus through the communication unit.

The advertisement message that is displayed on the first region of the display screen may include information of the specified application.

The external device according to the aspect of the present disclosure may further include a GUI generation unit, wherein the control unit controls the GUI generation unit and the display unit to generate and display a GUI for downloading the specified application in response to receiving a selection input of the first region of the display screen.

The control unit may control the communication unit to transmit a download command signal for the specified application to the display apparatus in response to receiving the download command for the specified application input through the GUI.

BRIEF DESCRIPTION OF THE DRAWINGS

The above and other aspects will be more apparent from the following detailed description of exemplary embodiments when taken in conjunction with the accompanying drawings, in which.

DETAILED DESCRIPTION OF EXEMPLARY EMBODIMENTS

Hereinafter, exemplary embodiments are described in detail with reference to the accompanying drawings.

Figure 1:
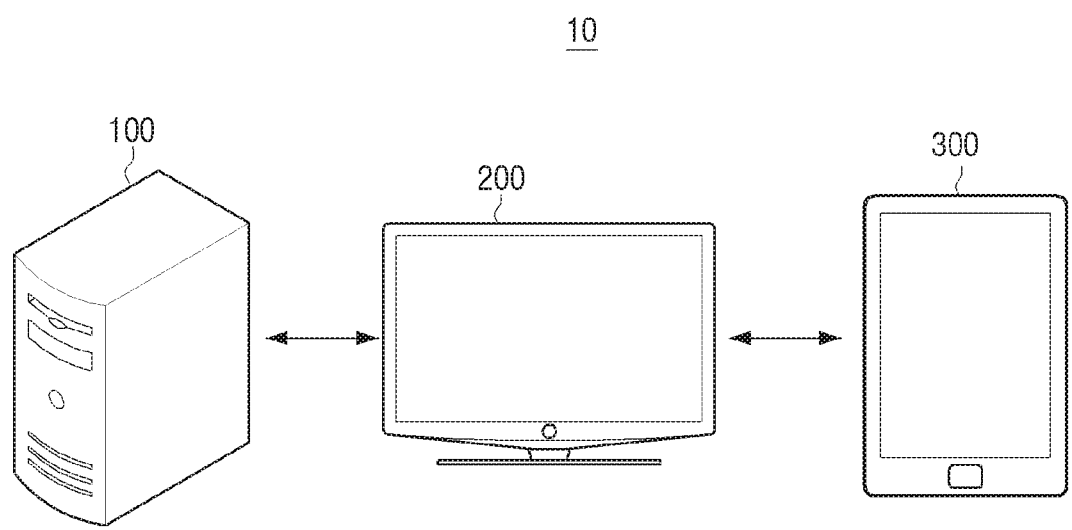
FIG. 1 is a diagram illustrating an application providing system according to an exemplary embodiment.

FIG. 1 is a diagram illustrating an application providing system according to an exemplary embodiment. As illustrated in FIG. 1, an application providing system 10 includes a server 100, a display apparatus 200, and an external device 300 that remotely controls the display apparatus.

The server 100 provides diverse applications through service providers. Specifically, if an application download request is received from an electronic apparatus, such as the external display apparatus 200, the server 100 provides an application to the external display apparatus 200.

In this case, the server 100 may receive application data and application control screen data, which is designed to have the corresponding application dedicated configuration and includes an application dedicated control command or an image.

The display apparatus 200 performs a general display apparatus function of receiving and displaying an image that is transmitted from a broadcasting station or an external source device. In addition, the display apparatus 200 may download and execute diverse application data and application control screen data corresponding to the application, which are transmitted from the external server 100.

In this case, if an application execution command is input to the display apparatus 200, the display apparatus 200 displays an application execution screen, and transmits a generation signal for generating an application control screen that corresponds to the executed application to the external device 300. In particular, if the application control screen data is previously transmitted to the external device 300, the generation signal may include a command for generating the application control screen using the application control screen data transmitted to the external device 300. However, if the application control screen data is not previously transmitted to the external device 300, the generation signal may include the application control screen data that corresponds to the application and a command for generating the application control screen.

Further, if a user command is input from the external device 300 using the application control screen, the display apparatus 100 receives the user command from the external device 300, and operates the application according to the received user command.

Further, if an advertisement message for a specified application is transmitted from the external server 100, the display apparatus 200 transmits the advertisement message for the specified application to the external device 300.

Further, if a download command signal for the specified application is input from the external device 300, the display apparatus 200 transmits a download request signal for the specified application to the external server 100. Then, the display apparatus 200 may download the specified application from the external server 100.

In this case, the specified application may be a newly uploaded application, an application recommended by a service provider, an application for a category designated by a user, or an application related to a currently executed application on the display apparatus.

The external device 300 is a device for remotely controlling the display apparatus 200. In particular, the external device 300 may be provided with a display unit that can display the application control screen that corresponds to the application transmitted from the display device 100. In this case, the external device 300 may be a portable device such as a tablet PC, a smart phone, or the like.

If an application control screen generation signal that corresponds to the application is received from the display apparatus 200, the external device 300 displays the application control screen. Further, if the user command is input through the application control screen, the external device 300 transmits the user command to the display apparatus 200.

Further, if the advertisement message for the specified application is received from the display apparatus 200, the external device 300 displays the advertisement message on a first region of the display screen.

Further, if a user selects the first region on which the advertisement message is displayed, the external device 300 generates a GUI menu for asking whether to download the specified application that corresponds to the advertisement message. If the download command for the specified application is received through the GUI menu, the external device 300 transmits the download command signal for the specified application to the display apparatus 200.

As described above, the application dedicated operation screens that are optimized for diverse application can be provided to the user through the application providing system 10, and the applications can be downloaded without installing and entering into application stores.

Hereinafter, with reference to FIGS. 2 and 3, the display apparatus 200 and the external device 300 that controls the display apparatus 200 will be described in more detail.

Figure 2:
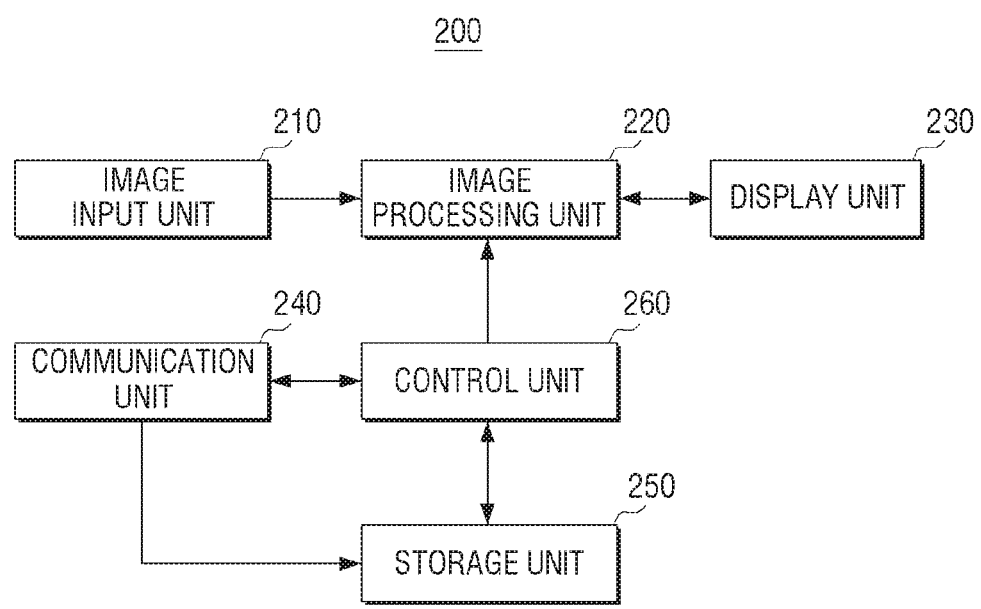
FIG. 2 is a block diagram illustrating the configuration of a display apparatus according to an exemplary embodiment.

FIG. 2 is a block diagram illustrating the configuration of the display apparatus 200 according to an exemplary embodiment. As illustrated in FIG. 2, the display apparatus 200 includes an image input unit 210, an image processing unit 220, a display unit 230, a communication unit 240, a storage unit 250, and a control unit 260. The term "unit" as used herein means a hardware component, such as a processor or circuit, and/or a software component that is executed by a hardware component such as a processor.

The image input unit 210 receives image data from a broadcasting station or a source device (for example, a DVD player, a set top box, or the like) by wire or wirelessly.

The image processing unit 220 performs signal processing with respect to image data received through the image input unit 210. Specifically, the image processing unit 220 performs signal processing tasks, such as decoding, scaling, and the like, with respect to the image data, to display the image data.

The display unit 230 receives the image signal processed through the image processing unit 220 and outputs the received image signal.

The communication unit 240 performs communication with the external server 100 and the external device 300 that serves as a remote controller. In this case, the communication unit 240 may perform the communication with the external server 100 through a network, such as the Internet, and may perform the communication with the external device 300 through a Bluetooth module, an infrared (IR) module, or a radio frequency (RF) module.

The storage unit 250 stores various kinds of data for controlling the display apparatus 200. The storage unit 250 also stores plural applications that are received from the external server 100 through the communication unit 240.

The control unit 260 controls the whole operation of the display apparatus 200 according to a user command and the data stored in the storage unit 250. In particular, the control unit 260 may control the display apparatus 200 so that the external device 300 for controlling the display apparatus 200 can execute the application control screen that corresponds to the application.

Specifically, if the application data and the application control screen data that corresponds to the application are received through the communication unit 260, the control unit 260 installs the received application, and transmits to the external device 300 the application control screen data that corresponds to the application. However, this is merely exemplary, and if the application execution command is input, the application control screen data that corresponds to the application may be transmitted to the external device 300 together with an application control screen generation command.

Further, if the application execution command is input, the control unit 260 controls the display unit 230 to display the application execution screen, and transmits an application control screen generation signal to the external device 300 to display the application control screen that corresponds to the executed application.

In this case, the application control screen generation signal may include meta data (for example, a title, a producer, the date of production, a version, and the like) for the executed application and a command for executing the application operation command that corresponds to the application. Further, if the application control screen data that corresponds to the application is not previously transmitted, the generation signal may include the application control screen data.

Further, the application control screen that is generated by the application control screen generation signal may be designed to have the application dedicated configuration, and may include an application dedicated control command that suits the application characteristics. For example, if the executed application is a driving game application, the application control screen may be a driving gate application dedicated operation screen that includes control commands and images, such as a handle, a gear, and the like, as illustrated on the right side of FIG. 4A. Further, if the executed application is a chatting/messaging application, the application control screen may be a chatting application dedicated operation screen that includes a keyboard type image, as illustrated in the right side of FIG. 4B. Further, if the executed application is a recording application, the application control screen may be a recording application dedicated operation screen that includes a microphone type image, as illustrated on the right side of FIG. 4C. However, the above-described application control screens are merely exemplary, and diverse application dedicated operation screens may be provided. For example, in the case of an application that requires numeral input, an operation screen for inputting numerals may be generated.

In addition, the application control screen may include a trademark of an application, a logo, a character, a production company, and the like, in addition to the control commands.

Further, if the user command is received from the external device 300 using the application control screen, the control unit 260 controls the whole display apparatus 200 according to the received user command.

Further, if an advertisement message for the specified application is received from the external server 100 through the communication unit 240, the control unit 260 transmits the received advertisement message to the external device 300. In this case, the specified application may be any one of a newly uploaded application, an application recommended by a service provider, an application for a category designated by a user, and an application related to a currently executed application on the display apparatus.

Further, if an advertisement region that is displayed on the external device 300 is selected, the control unit 260 receives the download command signal for the specified application that corresponds to the selected advertisement region from the external device 300, and downloads and installs the specified application that is received from the external server 100.

Figure 3:
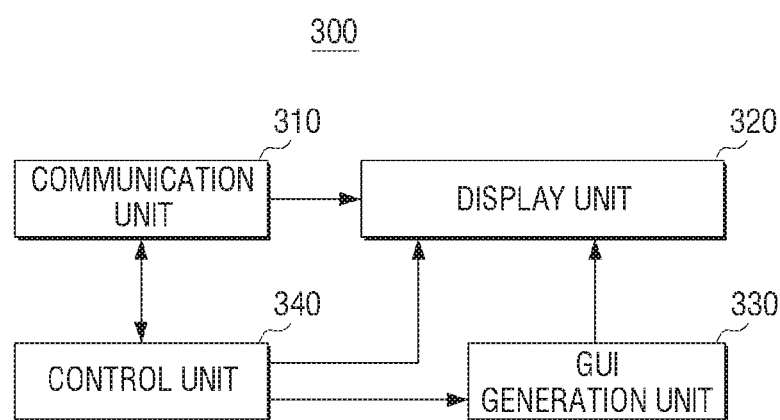
FIG. 3 is a block diagram illustrating the configuration of an external device according to an exemplary embodiment.

FIG. 3 is a block diagram illustrating the configuration of the external device 200 according to an exemplary embodiment. As illustrated in FIG. 3, the external device 200 includes a communication unit 310, a display unit 320, a graphic user interface (GUI) generation unit 330, and a control unit 340.

The communication unit 310 performs communication with the display apparatus 200. As described above, the communication unit 310 may use a Bluetooth module, an IR module, or an RF module in performing communication with the display apparatus 200.

The display unit 320 may display the application control screen that corresponds to the application. For example, as illustrated on the right side of FIGS. 4A to 4C, the display unit 320 may display an application dedicated operation screen.

Further, the display unit 320 may display the advertisement message for the specified application on a first region (hereinafter referred to as an "advertisement region") of the display screen.

The GUI generation unit 330 may generate a GUI (Graphic User Interface) that is displayed on the display screen in a form of an OSD (On Screen Display). In this case, the GUI generation unit 330 may generate a menu window for conforming whether to download the application that corresponds to the advertisement region.

The control unit 340 controls the whole operation of the external device 300 according to a user command. In particular, the control unit 340 may display the application control screen that corresponds to the application executed in the display apparatus 200.

Figure 4A:
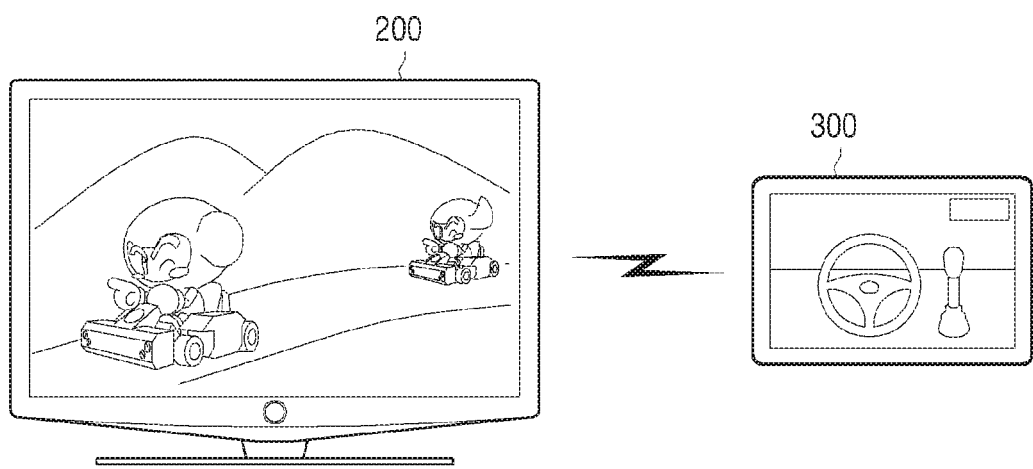
FIGS. 4A to 4C are diagrams illustrating an application dedicated operation screen according to an exemplary embodiment.
Figure 4B:
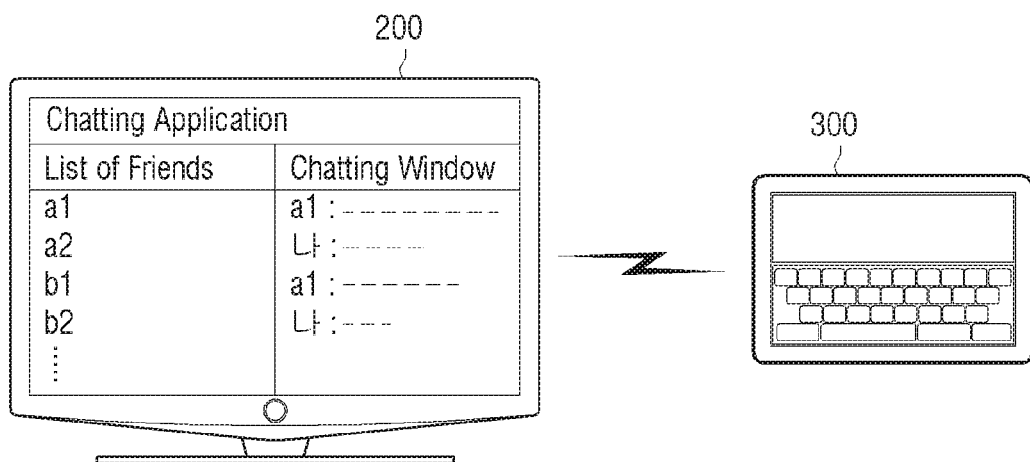
Figure 4C:
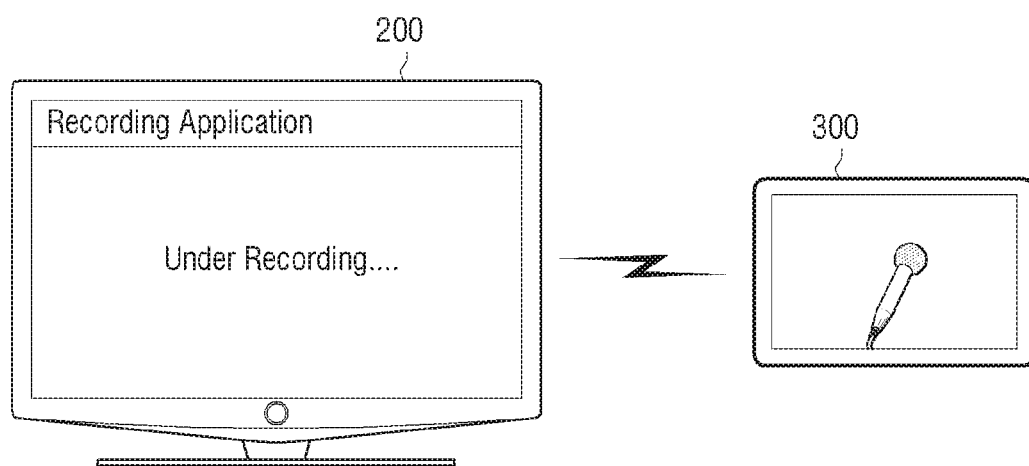

Specifically, if an application control screen generation signal that corresponds to the application is received from the display apparatus 200, the control unit 340 controls the display unit 320 to generate and display the application control screen that corresponds to the application. In this case, examples of the generated application control screen are illustrated in FIGS. 4A to 4C.

Further, if the user command is input using the generated application control screen, the control unit 340 transmits the user command for the application to the display device 200.

Further, if the advertisement message for the specified application is received from the display apparatus 200, the control unit 340 controls the display unit 320 to display the advertisement message for the specified application on the advertisement region. For example, as illustrated in FIG. 5A, the control unit 340 controls the display unit 320 to display the advertisement region 510 at the end of the application control screen.

In this case, the advertisement message that is displayed on the advertisement region may include a title of the application, an image, and information.

Figure 5A:
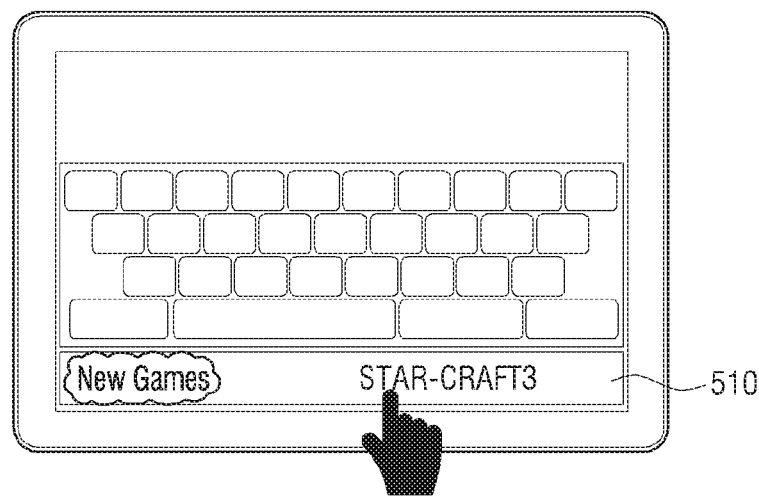
FIGS. 5A and 5B are diagrams illustrating a display screen for advertising and downloading a specified application according to an exemplary embodiment.
Figure 5B:
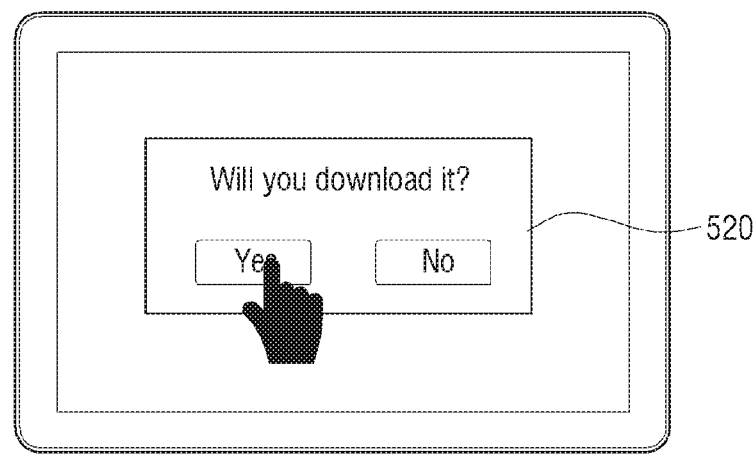

Further, if the advertisement region illustrated in FIG. 5A is selected (for example, if the advertisement region is touched) by the user, the control unit 340 controls the GUI generation unit 330 to generate a menu 520 for confirming whether to download the application that corresponds to the advertisement region, as illustrated in FIG. 5B.

Further, if the download command is input from the user through the menu 520, the control unit 340 transmits the download command signal for the specified application to the display device 200.

As described above, the user can receive the application dedicated operation screens optimized to the diverse applications through the display apparatus 200 and the external device 300, and can download the application desired by the user without installing or entering into the application stores.

Hereinafter, with reference to FIGS. 6 to 8, a method for providing an application will be described.

Figure 6:
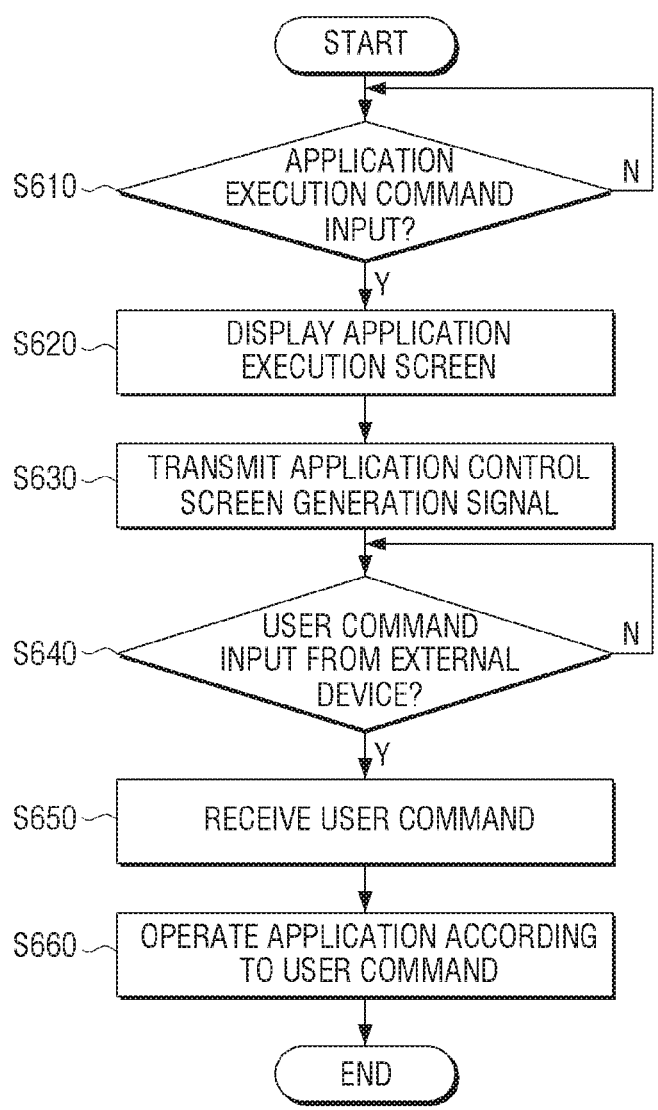
FIG. 6 is a flowchart illustrating a method for executing an application of a display apparatus according to an exemplary embodiment.

FIG. 6 is a flowchart illustrating a method for executing an application of the display apparatus 200 according to an embodiment.

First, the display apparatus 200 determines whether an application execution command is input from a user (S610). If the application execution command is input from the user ("Yes" in S610), the display apparatus 200 displays the application execution screen of which the execution command is input (S620).

Further, the display apparatus 200 transmits an application control screen generation signal to the external device 300 to generate the application control screen that corresponds to the application of which the execution command is input (S630). In this case, the application control screen generation signal may include a command for generating the application control screen and meta data of the application of which the execution command is input. However, if the application control screen data that corresponds to the application is not previously transmitted to the external device 300, the application control screen generation signal may include the application control screen data that corresponds to the application.

Further, if a user command is input from the external device 300 using the application control screen ("Yes" in S640), the display apparatus 200 receives the user command (S650), and operates the application according to the user command (S660).

Figure 7:
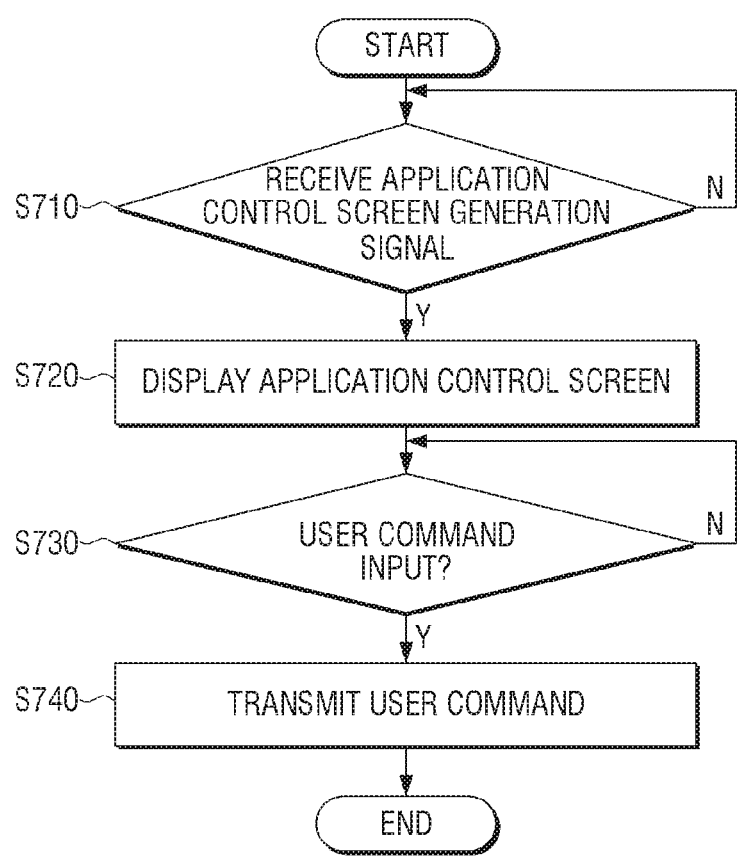
FIG. 7 is a flowchart illustrating a method for providing an application control screen of an external device according to an exemplary embodiment.

FIG. 7 is a flowchart illustrating a method for providing an application control screen of the external device 300 for controlling the display apparatus 200 according to an exemplary embodiment.

First, the external device 300 determines whether to receive an application control screen generation signal from the display apparatus 200 (S710). If the application control screen generation signal is received from the display apparatus 200 ("Yes" in S710), the external device 300 displays the application control screen (S620). In this case, as illustrated in FIGS. 4A to 4C, the application control screen is designed to have the application dedicated configuration, and includes an application dedicated control command that suits the application characteristics. In addition, the application control screen may include a trademark of an application, a logo, a character, and a production company, in addition to the control commands.

Further, the external device 300 determines whether the user command is input through the application operation command (S730). If the user command is input (S730), the external device 300 transmits the input user command to the display apparatus 200 (S740).

Figure 8:
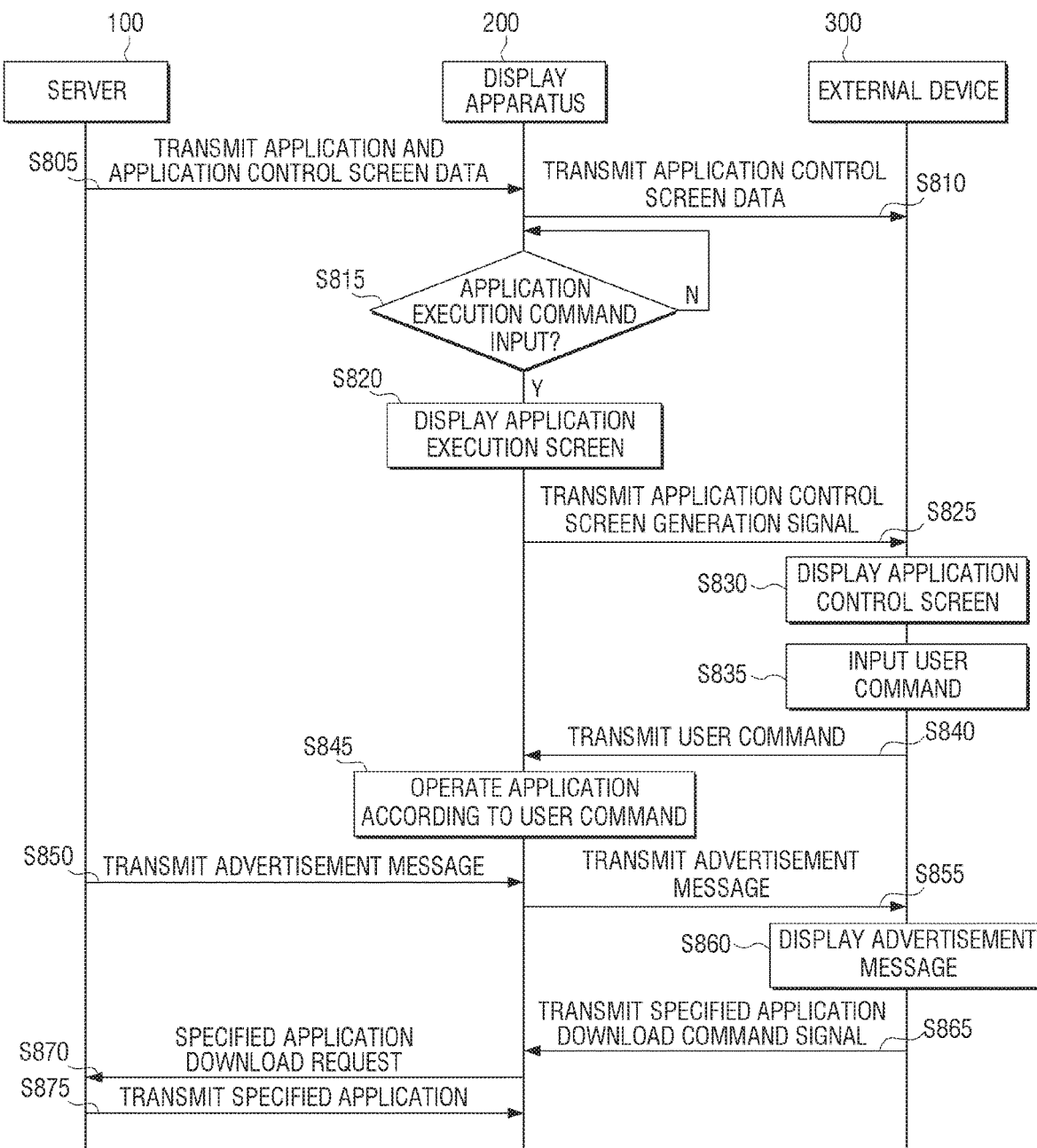
FIG. 8 is a flowchart illustrating a method for providing an application of an application providing system according to an exemplary embodiment.

FIG. 8 is a flowchart illustrating a method for providing an application of the application providing system 10 according to an exemplary embodiment.

First, the server 100 transmits the application and the application control screen data to the display apparatus 200 (S805). Then, the display apparatus 200 installs the application received from the server 100, and retransmits the application control screen data to the external device 300 (S810).

Thereafter, the display apparatus 200 determines whether the application execution command for the installed application is input (S815). If the execution command in input ("Yes" in S815), the display apparatus 200 displays the application execution screen (S820). Then, the display apparatus 200 transmits the application control screen generation signal that corresponds to the application of which the execution command is input to the external device 300 (S825).

If the external device 300 receives the generation signal from the display apparatus 200 (S825), the external device 300 displays the application control screen that corresponds to the application of which the execution command is input (S830). Then, the external device 300 receives a user command through the application control screen (S835), and transmits the input user command to the display apparatus 200 (S840). Then, the display apparatus 200 operates the application according to the transmitted user command (S845).

Further, if the server 100 transmits the advertisement message for the specified application to the display apparatus 200 (S850), the display apparatus 200 transmits the advertisement message for the specified application to the external device 300 (S855). If the advertisement message for the specified application is transmitted from the display apparatus 200, the external device 200 displays the advertisement message for the specified application on the advertisement region of the display screen as illustrated in FIG. 5A (S860).

Further, if the download command for the specified application is input, the external device 300 transmits the download command signal for the specified application to the display apparatus 200 (S865). If the download command signal is transmitted to the display apparatus, the display apparatus 200 transmits the download request signal for the specified application to the server 100 (S870), and receives the specified application from the server 100 (S875).

According to the method for providing an application as described above, application dedicated operation screens that are optimized to diverse applications can be provided to the user, and the applications can be downloaded without installing or entering into the application stores.

On the other hand, in the above-described embodiments, it is exemplified that the external device 300 receives the application control screen data that corresponds to the application from the display apparatus 200. However, this is merely exemplary, and the application control screen data may be pre-stored during the manufacturing of the display apparatus 200 or may be directly received from the server 100.

Further, in the above-described exemplary embodiments, it is exemplified that the external device 300 receives the advertisement message from the display apparatus 200. However, this is merely exemplary, and the external device 300 may receive the advertisement message directly from the server 100.

While certain exemplary embodiments have been shown and described, it will be understood by those skilled in the art that various changes in form and detail may be made therein without departing from the spirit and scope of the inventive concept, as defined by the appended claims.

What is claimed is:

1. A method performed in a display apparatus for executing an application, the method comprising:
   connecting via a communication unit with a mobile terminal device operating as a remote controller that controls the display apparatus;
   receiving, via the communication unit, a control signal for controlling the display apparatus from the mobile terminal device;

controlling the display apparatus to perform a function corresponding to the control signal;
receiving, via the communication unit, an application download command corresponding to an application that is not installed on the display apparatus from the mobile terminal device, wherein the application download command is generated based on a user command inputted through an application information displayed on the mobile terminal device;
transmitting, via the communication unit an application download request, to an external server based on the application download command;
receiving, via the communication unit, the application from the external server; and
installing the application on the display apparatus.

2. The method as claimed in claim 1, wherein the application download command is generated based on the user command inputted on an image corresponding to the application information displayed on the mobile terminal device while the display apparatus is connected via the communication unit with the mobile terminal device.

3. The method as claimed in claim 1, further comprising:
receiving application control screen data that corresponds to the application from the external server;
transmitting the application control screen data to the mobile terminal device; and
transmitting to the mobile terminal device, a generation signal that instructs the mobile terminal device to generate and display an application control screen for controlling the application using the application control screen data.

4. The method as claimed in claim 3, wherein the generation signal includes the application control screen data and a command that instructs the mobile terminal device to generate the application control screen.

5. The method as claimed in claim 3, wherein the generation signal is a signal configured according to parameters of the application and instructs the mobile terminal device to display the application control screen in a form of a user interface window that includes at least one of a region for receiving an application dedicated control command or an image.

6. A display apparatus comprising:
a display;
a communication unit; and
a control unit configured to:
control the communication unit to connect with a mobile terminal device operating as a remote controller that controls the display apparatus,
receive, via the communication unit, a control signal for controlling the display apparatus from the mobile terminal device,
perform a function corresponding to the control signal,
receive, via the communication unit, an application download command corresponding to an application that is not installed on the display apparatus from the mobile terminal device, wherein the application download command is generated based on a user command inputted through application information displayed on the mobile terminal device,
control the communication unit to transmit an application download request to an external server based on the application download command,
receive, via the communication unit, the application from the external server, and
install the application on the display apparatus.

7. The display apparatus as claimed in claim 6, wherein the application download command is generated based on the user command inputted on image corresponding to the application information displayed on the mobile terminal device while the display apparatus is connected via the communication unit with the mobile terminal device.

8. The display apparatus as claimed in claim 6, wherein the control unit is further configured to receive application control screen data that corresponds to the application from the external server, transmit the application control screen data to the mobile terminal device, and transmit to the mobile terminal device, a generation signal that instructs the mobile terminal device to generate and display an application control screen for controlling the application using the application control screen data.

9. The display apparatus as claimed in claim 8, wherein the generation signal includes the application control screen data and a command that instructs the mobile terminal device to generate the application control screen.

10. The display apparatus as claimed in claim 8, wherein the generation signal is a signal configured according to parameters of the application and instructs the mobile terminal device to display the application control screen in a form of a user interface window that includes at least one of a region for receiving an application dedicated control command or an image.

11. A method performed by an external device for remotely controlling a display apparatus, the method comprising:
connecting with the display apparatus for performing as a remote controller;
transmitting a control signal for controlling the display apparatus;
generating an application download command signal for downloading an application that is not installed on the display apparatus in response to receiving an user input for selecting the application; and
transmitting the application download command signal to the display apparatus, the application download command signal triggering the display apparatus to receive the application in response to the application download command signal and install the application.

12. An external device that remotely controls a display apparatus comprising:
a display;
a communication unit; and
at least one processor configured to:
control the communication unit to connect, via the communication unit, with the display apparatus for performing as a remote controller,
control the communication unit to transmit, via the communication unit, a control signal for controlling the display apparatus,
generate an application download command signal for downloading the application that is not installed on the display apparatus in response to receiving an user input for selecting the application, and
control the communication unit to transmit, via the communication unit, the application download command signal to the display apparatus, the application download command signal triggering the display apparatus to receive the application in response to the application download command signal and install the application.

* * * * *